United States Patent
Bouamra et al.

(10) Patent No.: US 7,307,395 B2
(45) Date of Patent: Dec. 11, 2007

(54) SAFETY DEVICE FOR A SLIDING PANEL DRIVEN BY AN ELECTRICAL MOTOR AND METHOD FOR IMPLEMENTING SUCH A DEVICE

(75) Inventors: Mohamed Bouamra, Strasbourg (FR); Jésus Zaldua, Hondarribia - Gipuzkoa (ES); Javier Vicandi, Zarautz - Gipuzkoa (ES); Jésus Iriondo, Zarautz - Gipuzkoa (ES)

(73) Assignee: Talltec Technologies Holdings S.A., Luxembourg (LU)

( * ) Notice: Subject to any disclaimer, the term of this patent is extended or adjusted under 35 U.S.C. 154(b) by 888 days.

(21) Appl. No.: 10/742,777

(22) Filed: Dec. 23, 2003

(65) Prior Publication Data

US 2004/0138843 A1   Jul. 15, 2004

Related U.S. Application Data

(62) Division of application No. 09/460,969, filed on Dec. 15, 1999, now Pat. No. 6,772,559.

(30) Foreign Application Priority Data

Dec. 15, 1998   (EP) .................................. 98123825

(51) Int. Cl.
*G05B 5/00* (2006.01)
(52) U.S. Cl. ...................... 318/445; 318/443; 318/444; 318/449; 318/466; 318/469
(58) Field of Classification Search ................ 318/445, 318/443, 444, 449, 466, 467, 468, 469, 280; 340/628

See application file for complete search history.

(56) References Cited

U.S. PATENT DOCUMENTS

| | | | |
|---|---|---|---|
| 5,051,672 | A | 9/1991 | Yaguchi |
| 5,404,673 | A | 4/1995 | Takeda et al. |
| 5,410,226 | A | 4/1995 | Sekiguchi et al. |
| 5,428,923 | A | 7/1995 | Waggamon |
| 5,774,046 | A | 6/1998 | Ishihara et al. |
| 5,801,347 | A | 9/1998 | Tsuge et al. |
| 5,880,421 | A | 3/1999 | Tsuge et al. |
| 5,932,931 | A | 8/1999 | Tanaka et al. |
| 6,163,080 | A | 12/2000 | Castellon |
| 6,316,846 | B1 | 11/2001 | Kashiwazaki et al. |
| 2004/0257235 | A1* | 12/2004 | Right et al. ................. 340/628 |

FOREIGN PATENT DOCUMENTS

DE    38 09 957    10/1989

(Continued)

*Primary Examiner*—Karen Masih
(74) *Attorney, Agent, or Firm*—Sughrue Mion, PLLC

(57) ABSTRACT

The invention concerns a sequential safety system associated with a moving closing panel driven so as to slide by an electric motor (6), this safety system including means (20) exploiting the signal originating from an optical fiber to stop and reverse the direction of movement of said moving panel in the event of a change in the signal, as well as additional safety means allowing the end-of-travel positions of the moving panel to be determined without ambiguity via the joint exploitation of the results derived from measuring the frequency of the pulses caused by the rotation of the electric motor (6) driving said moving panel, as well as data originating from the optical fiber.

40 Claims, 11 Drawing Sheets

FOREIGN PATENT DOCUMENTS

| | | |
|---|---|---|
| DE | 39 11 493 | 10/1990 |
| DE | 40 30 607 | 4/1992 |
| DE | 44 16 803 | 11/1994 |
| DE | 40 30 904 | 3/1995 |
| DE | 43 31 781 | 3/1995 |
| DE | 44 23 104 | 1/1996 |
| DE | 196 23 420 | 12/1997 |
| DE | 197 24 952 | 12/1997 |
| EP | 345 914 | 1/1989 |
| EP | 419 267 | 9/1990 |
| GB | 2 125 572 | 3/1984 |

* cited by examiner

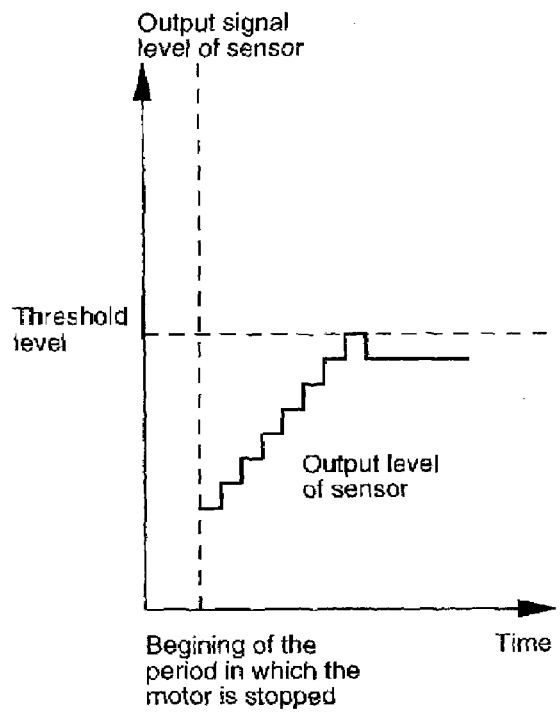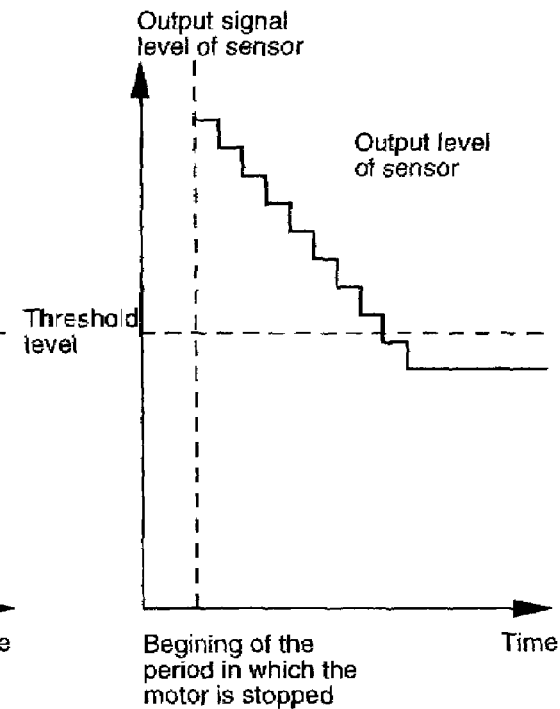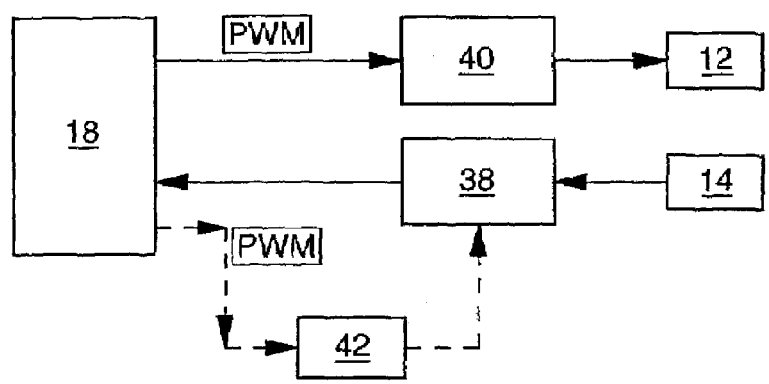

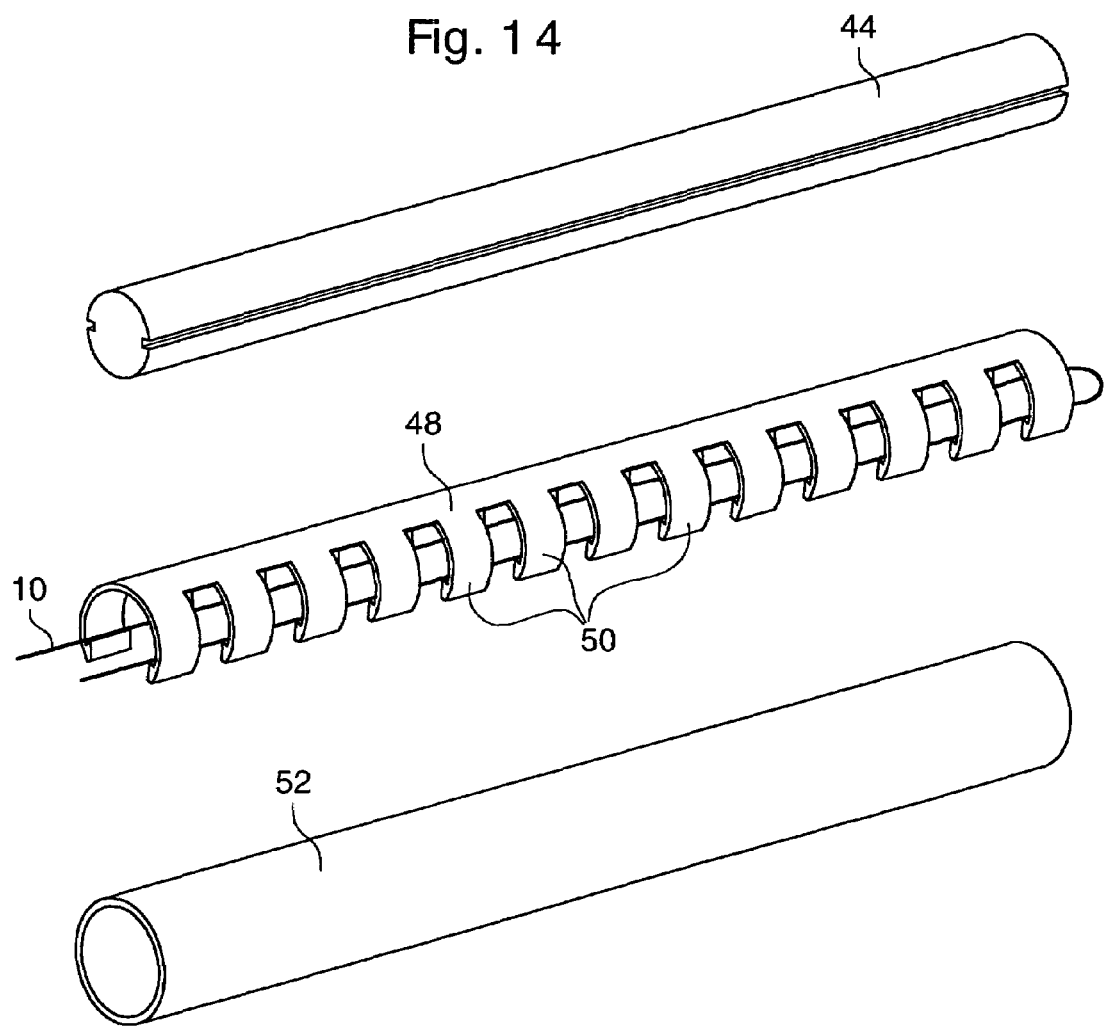

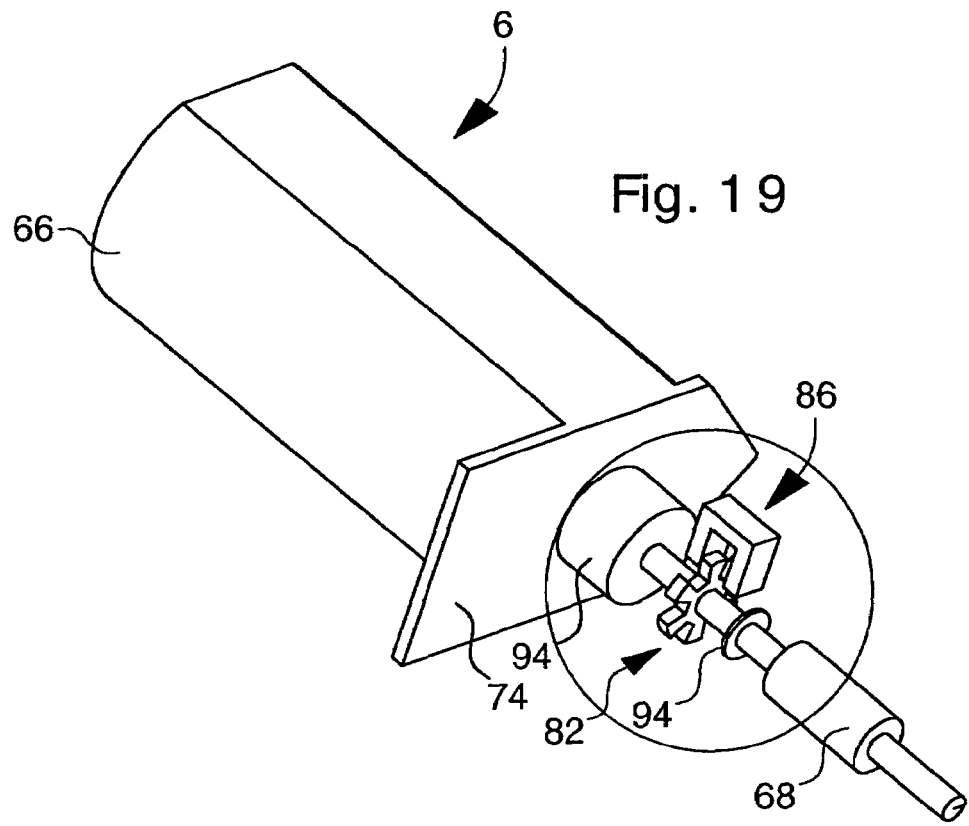
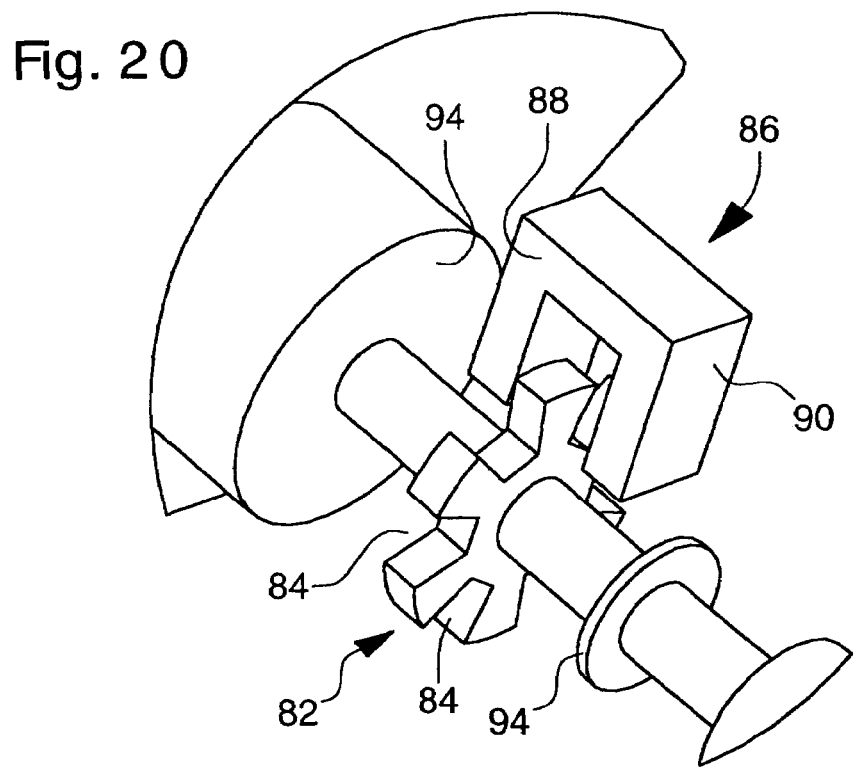

SAFETY DEVICE FOR A SLIDING PANEL DRIVEN BY AN ELECTRICAL MOTOR AND METHOD FOR IMPLEMENTING SUCH A DEVICE

This is a divisional of application Ser. No. 09/460,969 filed Dec. 15, 1999, the disclosure of which is incorporated herein by reference.

The present invention concerns a method called a sequential method for controlling a sliding moving panel driven by an electric motor, wherein the signal originating from an optical fibre pressure sensor is exploited in a sequential manner to stop and reverse the operating direction of the driving motor in the event of a variation in said signal, and wherein the frequency measurement of the pulses generated by an encoding device is exploited to perform pre-detection of an obstacle and to determine the end of travel positions of the moving panel.

The invention also concerns a safety device for such a moving panel including means for detecting the presence of a foreign body braking said moving panel's movement and preventing it from closing completely.

The invention also concerns an optical fibre force sensor able to be used in particular in safety devices of the aforementioned type.

Finally, the object of the invention is to provide a method for calibrating the aforementioned direct and indirect detection means which allows the reliability of the operation of the sensor to be increased.

Automobile vehicles are increasingly fitted with electric windows, i.e. systems wherein the windows are driven so as to slide in the opening direction or the closing direction by an electric motor whose operation is controlled by the driver of the vehicle by means of a manual switch. Such systems have allowed substantial progress to be made as regards automobile safety, insofar as the driver can easily open or close the windows while continuing to pay attention to traffic conditions and to driving the vehicle. These systems have, however, significant problems as to reliability which are often linked to the appearance of current peaks when the motor driving the window is stopped too abruptly. It is known that any obstacle blocking the movement of the window generates current peaks in the motor which are generally damaging, particularly for certain components, such as the control relays or the switching transistors. Such peaks can appear, for example, when the driver continues to activate the switch which controls the operation of the driving motor when the window has already reached the closed position in which it is pressed against the door frame. Current peaks can also appear when a foreign body, for example an arm, is resting on the edge of the window and prevents the latter from moving upwards.

In order to overcome the aforementioned difficulties, a known solution consists in measuring the maximum level of the supply current provided to the driving motor, and blocking said current above a predetermined threshold. This measurement is generally performed across the terminals of a switching transistor whose resistance varies from one component to another and remains dependent upon the temperature. Other methods use precision resistors (current measurements) or Hall effect sensors (magnetic field measurements), but the cost price of such components is high.

Another control method, which is less expensive and more efficient, consists in detecting the pulses caused by the switching of the driving motor brushes. These pulses are superposed with the direct consumption current of the motor, and their frequency is proportional to the speed of the rotor. A technique of this type is described in U.S. Pat. No. 4,870,333 in the name of the Sidosha Denki Kogyo company which proposes a method for controlling electric windows for automobile vehicles wherein the number of pulses generated by the operation of the electric motor driving the window is stored in a counter. When the number of pulses stored in the counter reaches a maximum predetermined value, the control device which operates the system concludes that the window has reached the fully open position and causes the driving motor to stop. Conversely, when the window moves up, the number of pulses stored in the counter is reduced by one unit per revolution of the driving motor. When this number becomes equal to zero, the system concludes that the window has reached the closed position in which it presses against the door frame, and again stops the driving motor.

The main drawback of the above system is that the speed at which the window rises is not constant and depends on numerous parameters such as the drive torque of the motor, the friction between the window and the door frame, the speed and trajectory of the vehicle, etc. Consequently, the position of the window cannot be calculated with sufficient accuracy for the moment at which the window is completely closed to be determined exactly. With such a method, one can at most determine an end of travel zone in which one knows that the window is close to the door frame. The driving motor can, consequently, be stopped on the command of the control device before the window is completely closed. Conversely, the window can continue to be supplied with current when the window is already completely closed, which generates current peaks which are damaging to the motor and the electronic control circuit. On the other hand, nothing in the Sidosha patent is provided for detecting, prior to pinching, an overload which would form an obstacle to the progress of window. Finally, nothing is provided for detecting the presence of a foreign body such as a child's hand, the thickness of which is equal to or less than the end of travel zone. Thus, during the automatic closing of moving panels, such as, in particular, an automobile vehicle window, one has to try to assure safety by preventing a foreign body such as, for example, an arm or a hand, being caught between said window and the door frame against which it has to be pressed. For this purpose, in the event that something is caught, a safety device stops the driving or reverses the direction of movement of the window. Among known safety devices, one solution consists in incorporating an electromagnetic wave guide, for example an optical fibre, inside the sealing gasket into which the window is guided. An emitter, for example a laser diode, injects a light signal at the end of the fibre. This signal propagates up to a receiver, for example a photodiode, placed at the other end of the fibre. In the event of an incident, the foreign body is driven by the window as it moves upwards towards the sealing gasket and exerts pressure on the optical fibre. By the effect of the pressure, the optical fibre is deformed, which causes a local modification in its radius of curvature. This modification in the fibre's radius of curvature causes significant losses, and consequently a drop in the amplitude of the optical signal picked up by the receiver. There results a drop in the amplitude of the electric signal transmitted by the receiver to a control circuit, which, in response to this drop, produces a stop or direction reversal signal for the motor driving the window.

A safety device associated with the sliding window of the door of an automobile vehicle is known from German Patent No. DE 44 16 803. This device includes a magnet arranged on the shaft of the electric motor driving the window with which is associated a Hall effect sensor. As a function of the signals transmitted by the Hall effect sensor, a microprocessor can determine that the window has reached its completely closed position. The microprocessor can also detect a reduction in the speed at which the window moves upwards due to the effect of the presence of a foreign body, and can command the reversal of the direction of movement of said window to avoid anything being caught therein. In addition to this indirect detection device, the safety device includes a direct detection device including a pressure sensor arranged in the door frame.

The main drawback of the above safety device lies in the fact that the indirect detection means continue to be used as obstacle detection means even when the window comes in proximity to its completely closed position. It has already been stated that the speed at which the window moves upwards is not constant and that it depends on numerous parameters. Thus, if because of measuring inaccuracies, the microprocessor does not indicate that the window is closed while the latter is in fact closed, said microprocessor will interpret this situation as a situation in which something is caught, and will command the driving motor to stop and reverse its working direction. It becomes impossible at this moment to close the window.

The safety devices of the type described hereinbefore which use optical fibre pressure sensors as obstacle detectors have numerous drawbacks both as regards their industrial manufacture and as regards their performance with the user. These safety devices must, in fact, be produced on a large scale to satisfy the demands of the market, such as the automobile market. This thus assumes a manufacturing method which is both simple and quick with inexpensive components and materials. The same is true for the test and calibration procedures which must be quick and which allow the direct and indirect detection means to keep their operating features over time. As will be seen in the following description, it is difficult, in such conditions, to obtain products with homogenous features.

A first problem is linked to the fact that it is difficult to be able to have available large quantities of low cost optical sources having features which have little scattering. This concerns in particular the power and transmission angle as well as the radiation spectrum of such sources.

A second problem is linked to the fact that the optical fibre used in the sensor has to be fixed to the optical source either by means of specific connectors or more simply by bonding. This requires several operations for preparing the ends of the fibre (stripping off the coating, breaking or polishing), centring the fibre with respect to the optical source, and finally fixing by means of quick setting resins. Large scale manufacture necessarily involves significant dispersion of the power injection output in the fibre, which affects the performance of the sensor.

As described hereinbefore, optical fibre sensors mostly work on the principle of losses induced by the variation in the radius of curvature of said fibre by the effect of pressure. The setting in place of the fibre and preparation of the sensitive part of the sensor thus necessarily introduce dispersion in the stresses in the optical fibre, which leads to dispersion in the performance of the sensors.

It can also be noted that the performance of the sensors greatly depends on the conditions in which they are used, and their environment. This is the case, for example, of automobile applications where the sensors have to operate within ambient temperature ranges comprised between −40° C. and +85° C. It is clear that, in such conditions, the features of certain components such as the optical source cannot remain constant (emission power and spectral field). The same is true for the power injection output in the fibre which greatly depends on the thermal properties of the materials used for the source-fibre connection.

The problem is all the more significant as regards the sensitive part of the sensor. Assuming that the optical fibre is not itself sensitive to temperature variations, the materials which are used as support and sheath, generally polymers, can undergo thermal stress, which results in pressure variations applied to the fibre. These effects, to which is added the intrinsic sensitivity of the optical fibre to the temperature, can cause variations of more than 80% in the output signal.

Finally, in addition to the problems linked to the conditions of use of the sensor, there are the inevitable variations in the features of the latter caused by normal wear of the materials and components.

The list of the aforementioned problems shows the difficulties which have to be overcome in order to be able to manufacture on a large scale and at a low cost optical fibre pressure sensors which can be used as obstacle detectors. Sensitivity to certain disturbances as well as wear phenomena mean that the original calibration cannot be kept. This results in problems of reliability and even, in certain cases, non operation of the safety devices using such sensors.

The object of the present invention is to overcome the aforementioned problems and drawbacks by providing a reliable safety device for driving and closing sliding panels electrically powered.

The invention thus concerns a sequential control method for a moving panel which is driven so as to slide in a frame by an electric motor, including the steps of:

detecting by first means the presence of a foreign body capable of preventing the complete closing of said moving panel by becoming caught between said panel and the frame inside which said panel slides;

measuring by second means the frequency of the pulses caused by the rotation of the electric motor driving the moving panel;

generating an alarm signal when the presence of the foreign body is detected;

stopping, then reversing the working direction of the electric driving motor on reception of the alarm signal; and stopping the driving motor or reversing its working direction when the frequency of the pulses becomes substantially zero in the absence of the alarm signal.

Thus, when the window is closed, one can deduce that in the absence of the alarm signal, the window abuts against the door frame and that any risk of accident has been avoided. Conversely, in the case of the alarm signal, the reversal of the working direction of the driving motor is immediately commanded. As a result of these features, the sequential detection method according to the invention simultaneously allows personal safety to be increased and the electrical and electronic parts to be protected efficiently against current peaks.

According to another feature of the method of the invention, the frequency of the pulses caused by the rotation of the electric motor driving the panel is measured, and said motor is stopped or the working direction thereof is reversed when the frequency of said pulses becomes less than a predetermined frequency threshold.

According to another feature of the method, the presence of a foreign body capable of preventing the complete closing of the moving panel is detected using an optical fibre pressure sensor.

According to another feature of the method, one deducts from the measurement of the number of pulses caused by the rotation of the electric driving motor an indication of the travel of the moving panel from a previously known reference position, and one commands a speed deceleration ramp of the driving motor, when the moving panel reaches an end-of-travel zone.

According to another feature of the method, when the moving panel reaches the end-of-travel zone, the means used to measure the frequency of the pulses caused by the rotation of the electric motor are no longer used for detecting the presence of an obstacle capable of preventing the complete closing of the moving panel, but are only used for determining the position of said panel relative to the frame into which it slides.

According to another feature of the method, the reference position is the last calculated position of the moving panel prior to the stopping of the driving motor.

The measurement of the number of pulses caused by the rotation of the driving motor allows the travel of the moving panel to be calculated from a previously known reference position. In the case of an automobile vehicle, because of the inertial forces due to jerks, the effects of friction and slipping, the indirect determination of the position of the window has a certain error rate. This error rate is cumulative. Thus, after ten attempts at moving the window downwards and upwards, the cumulative space between the calculated position and the real position of said window is of the order of one to two centimeters. However, this error remains sufficiently reliable to allow an end-of-travel zone to be defined for the downward and upward movements of the window, a zone in which said window is in proximity to the door frame against which it has to be applied. The delay time due to the variation in current with respect to the rotational speed of the motor is advantageously used to limit current peaks and to protect the motor and its control unit efficiently.

The invention also concerns a method for controlling a moving panel driven so as to slide by an electric motor, characterised in that it consists in measuring the frequency of the pulses caused by the rotation of the electric motor driving the moving panel, and in stopping or reversing the working direction of said motor when the frequency of such pulses becomes less than a predetermined frequency threshold.

Since the frequency of the pulses is proportional to the rotational speed of the driving motor, it becomes possible to detect the presence of an obstacle braking the movement of the closing panel and preventing it from moving upwards. This is the case, for example, of the action of an arm placed on the edge of an automobile vehicle window. The comparison of this measured speed with a reference speed thus allows pre-detection of an obstacle and, in certain cases, prevents such obstacle being caught. It also allows the current peaks which are particularly damaging, especially for the driving motor electronic control circuit, to be considerably reduced.

The invention also concerns a safety device including means for detecting the presence of a foreign body braking the movement of a moving panel driven so as to slide by an electric motor and preventing it from closing, characterised in that said detection means are of the indirect type, based on the measurement of the frequency of the pulses caused by the rotation of the electric motor.

According to another feature of the invention, the aforementioned indirect type of detection means are associated with second means for directly detecting the presence of a foreign body, these means including a pressure sensor formed by an optical fibre associated with means for transmitting and receiving optical signals propagating within said fibre.

Another object of the present invention is to provide an optical fibre pressure sensor which can be used as an obstacle detector keeping its original calibration despite its sensitivity to physical disturbances such as the temperature and to the wear phenomena of the materials of which it is formed.

The invention therefore also concerns a method for calibrating an optical fibre pressure sensor used as an obstacle detector in a drive system for an electrically sliding moving panel, the sensor including an emitter supplied with electric power which injects a light signal into an optical fibre, the light signal propagating up to a receiver which transmits, in response to the light signal transmitted by the optical fibre, an electric signal to a control unit with a microcontroller and/or a microprocessor which analyses the data originating from said receiver and, in the event of an incident, allows the electric motor driving the moving panel to be stopped or the working direction thereof to be reversed, the method being characterised in that, during the periods in which it is observed that the motor driving the moving panel has stopped, the operating parameters of the pressure sensor are compared and corrected, taken in any environmental conditions, as a function of the same parameters of a standard sensor taken in known reference conditions stored in a non volatile memory which is accessible to the microcontroller and/or the microprocessor of the control unit.

As a result of these features, the pressure sensor calibration method begins as soon as the stopping of the motor driving the moving panel is observed. Preferably, the operating parameters of the sensor are measured and corrected repeatedly during the entire duration of the stopping time of said driving motor. During the motor operating periods, only the last corrections of the pressure sensor operating parameters stored in the memory are taken into account. The performances of the pressure sensor can thus be kept, despite wear phenomena and the existence of physical disturbances to which the sensor is sensitive.

According to a first implementation variant, the method of the invention includes the steps of:
 cutting off for a short instant the emitter's electric supply current as soon as it is observed that the motor driving the moving panel has stopped;
 measuring the offset level of the electric signal transmitted by the receiver, then resetting its value to zero;
 supplying the emitter again by means of a constant direct electric current $\Delta I_0$; and
 measuring the output level $V_S$ of the receiver, and allocating it a coefficient k such that $kV_S = V_R$, where $V_R$ is a known reference level of a standard sensor taken in known reference conditions.

According to a second implementation variant, the method of the invention includes the steps of:
 supplying the emitter by means of a periodic rectangular current;
 measuring the high output level $V_S$ of the receiver as well as its variation $\Delta V_S$, and
 performing the operation $V_S (\Delta V_S/\Delta V_R) = V'_S$ and determining the coefficient $C = V_R - V'_S$ so that $V_S'' = V_R$, where $V_R$ and $\Delta V_R$ are known reference values of a standard sensor taken in known reference conditions, the ratio $\Delta V_S/\Delta V_R$ is the pressure sensor sensitivity correction coefficient, and C is the residual offset correction coefficient of said sensor.

According to another alternative implementation, the method of the invention includes the steps of:
- supplying the emitter by means of a periodic rectangular current;
- measuring the high output level $V_S$ of the receiver as well as its variation $\Delta V_S$;
- calculating the pressure applied as a function of the level of the measured signal by means of a polynomial equation of a degree greater than or equal to 1 and whose coefficients are initially determined during a first calibration; and
- periodically correcting these coefficients as a function of the measurement results in order to obtain a reliable pressure measurement.

Yet another object of the present invention is to provide a pressure sensor which is simple and inexpensive to manufacture.

The invention also concerns a method for calibrating means for indirectly detecting the presence of a foreign body capable of preventing the complete closing of a moving panel driven so as to slide into a frame by an electric motor, these means allowing the detection of the electric pulses generated by the rotation of the motor and controlling the stopping, then the reversal of the working direction of said motor when the frequency of the pulses becomes less than a threshold frequency, this method being characterised in that it includes the steps of:
- measuring, for different positions of the moving panel relative to the frame in which said panel moves, the corresponding frequency of the pulses caused by the rotation of the motor to determine the instantaneous speed of movement of the panel in a given position; and
- comparing, for each position of the moving panel, the frequency of the measured pulses to the frequency of the same pulses during the preceding travel of said moving panel so that, if there is a difference between said frequencies and this difference does not exceed a predetermined safety value, the threshold frequency is corrected so that it does not command the stopping and reversal of the working direction of the motor.

Other features and advantages of the present invention will appear more clearly upon reading the following description of an implementation example of the method according to the invention, this example being given purely by way of non-limiting illustration in conjunction with the annexed drawings, in which:

FIGS. 8 to 12 illustrate two autocalibrating methods of the safety system according to the invention;

FIGS. 13 to 16 are perspective views of various alternative embodiments of the pressure sensor according to the invention;

FIG. 19 is a perspective view of the driving motor on the shaft of which is mounted an optical encoding disc associated with an opto-coupling device;

FIG. 20 is a larger scale detailed view of the encoding disc and the opto-coupling device shown in FIG. 19;

Figure 1:
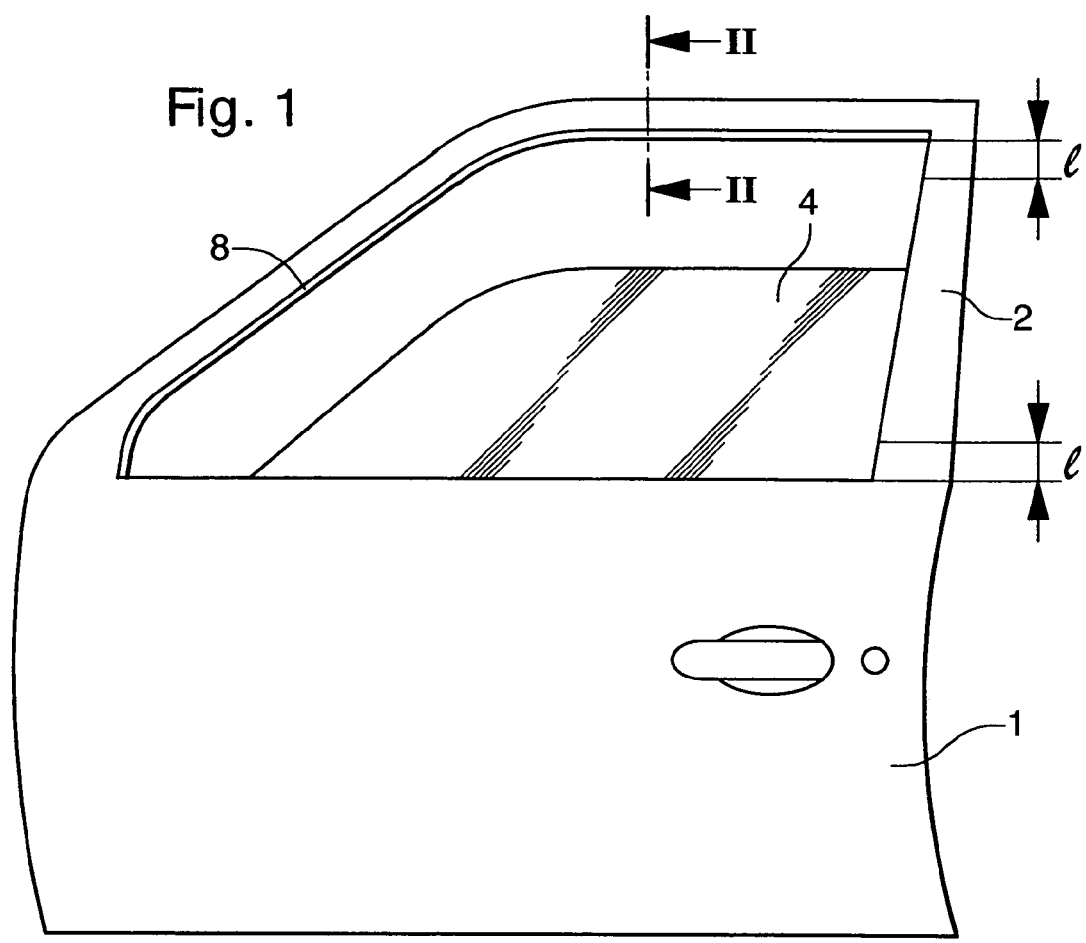
FIG. 1 shows a door of an automobile vehicle fitted with the security device according to the invention.

The present invention proceeds from the general inventive idea which consists in providing a sequential detection system in which the indirect detection means, based on measuring the frequency of the pulses caused by rotation of the electric driving motor, allow the electric and electronic elements to be efficiently protected from the current peaks which are particularly harmful to them, whereas the direct detection means, based on measuring the variation in a physical disturbance due to the effect of the presence of a foreign body preventing a moving panel from closing completely, allow personal safety to be increased considerably.

The present invention will be described with reference to an electric window lifter device fitted to an automobile vehicle. It goes without saying however that the present invention applies to all types of electrically controlled moving panels which slide such as an automobile vehicle sliding roof, the doors of an elevator, fire doors or other.

FIGS. 1 to 6 show a door 1 of an automobile vehicle having a frame 2 into which slides a window 4 via the action of an electric driving motor 6. Frame 2 of door 1 is provided with a sealing gasket 8 in at least one portion of which is arranged an optical guide 10 formed, for example, by a multimode optical fibre. As will be described in more detail hereinafter, optical fibre 10 is associated with emission and reception means 12 and 14 respectively for the optical signals propagating within said fibre 10. These means are adjusted to control the operation of the electric window lifter mechanism or the anti-theft system of the vehicle to which they are fitted.

Figure 2:
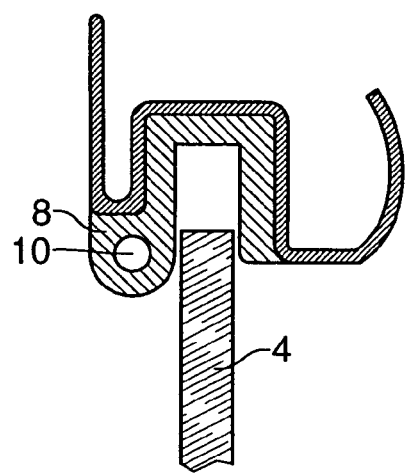
FIG. 2 is a cross-section along the line II-II of FIG. 1.
Figure 3:
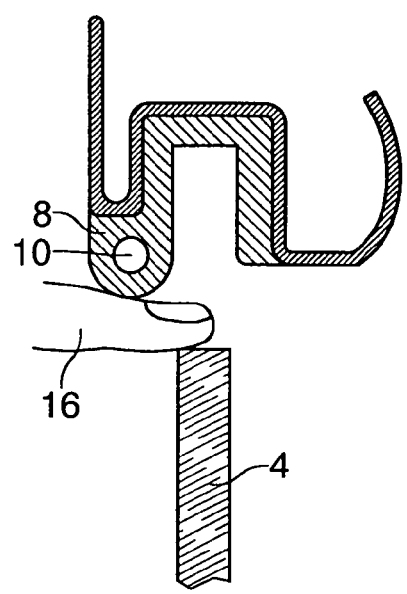
FIG. 3 is a similar view to that of FIG. 2 in which a foreign body, such as a finger caught between the window and door frame, is shown.

As FIG. 2 shows, optical fibre 10 is placed in sealing gasket 8 outside the path of window 4. Since window 4 rises via the action of its driving motor 6, if a finger 16 is caught between said window 4 and frame 2 of door 1 (FIG. 3), optical fibre 10 is crushed by finger 16. Via the effect of the pressure exerted by finger 16, optical fibre 10 is deformed, which causes local modification of its radius of curvature. This curvature causes attenuation of the power of the optical signals propagating in optical fibre 10. This results in a drop in the amplitude of the electric signals transmitted by receiver 14 to a central unit 18 which, in response to this drop, generates a signal stopping or reversing the working direction of motor 6 driving window 4.

Figure 4:
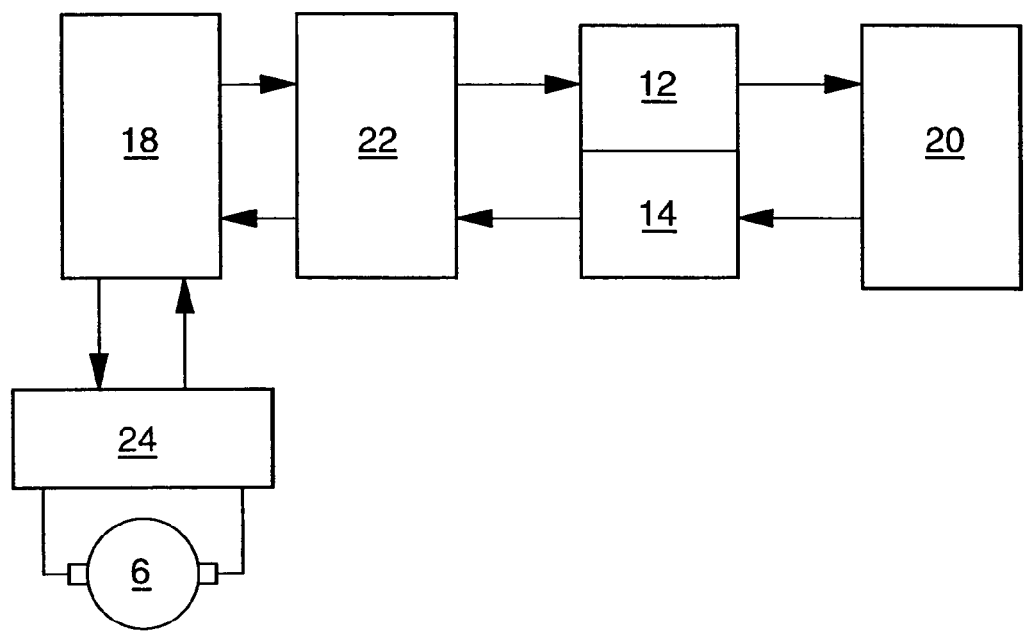
FIG. 4 is a schematic diagram of the safety device according to the invention.

FIG. 4 shows a schematic diagram of the safety device according to the invention. A pressure sensor, designated as a whole by the general numerical reference 20, includes aforementioned multimode optical fibre 10 which operates on the principle of modulating the intensity of the light propagating as a function of the pressure applied. Pressure sensor 20 is associated with emission and reception means 12 and 14 for the optical signals propagating within said fibre 10.

Figure 5:
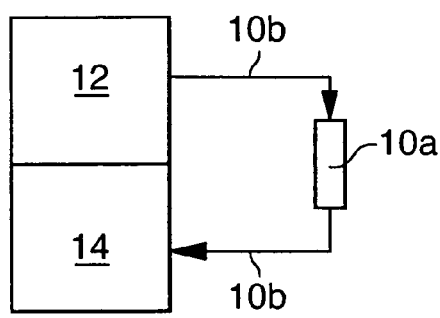
FIG. 5 is a schematic diagram of an optical fibre pressure sensor operating in transmission mode.

According to a first alternative embodiment shown in FIG. 5, pressure sensor 20 operates in transmission mode. Optical fibre 10 includes a portion 10a which forms the sensitive element of pressure sensor 20, and a portion 10b acting as light transmission line. Emission means 12 inject a light signal at one end of fibre 10. These emission means 12 include an optical source which is arranged so as to be securely fixed to optical fibre 10, in order to avoid the use of optical connectors which are too expensive. The optical source will preferably be an electroluminescent diode. The light signal injected into optical fibre 10 propagates as far as detector 14 such as a photodiode which is also securely fixed to the other end of said fibre 10.

According to a particularly advantageous feature of the invention, the electroluminescent diode and the photodiode are of the SMD (surface mount device) type, packaged in the same case which also accommodates the two ends of optical fibre 10 forming pressure sensor 20. The case further includes connecting means facilitating the mounting thereof on an electronic board.

Figure 6:
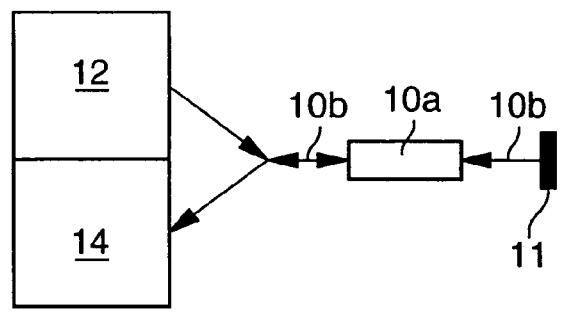
FIG. 6 is a schematic diagram of an optical fibre pressure sensor operating in reflection mode.

According to a second alternative embodiment shown in FIG. 6, pressure sensor 20 can also operate in reflection mode. In this latter case, source 12 and receiver 14 are situated at the same end of fibre 10, whereas a reflector 11 reflecting the light signals is arranged at the other end of said fibre 10. The transmission and reception functions are preferably assured by a laser diode fitted with its own photodetector cell.

A power supply circuit 22 supplies optical source 12 with current. This current can be direct and/or variable periodically over time. According to a preferred feature of the invention, the current will be direct during the operating periods of driving motor 6, and of periodic rectangular shape during the idle periods. Circuit 22 also includes converth and amplification circuits for the currents derived from detector 14.

The safety device according to the invention also includes a control circuit 24 for driving motor 6. This control circuit 24 has a bridge type structure for the two-directional control of said motor 6. It may be formed entirely from a base of semiconductors or may include relays. The use of MOS type transistors allows the relays to be switched with a very low current, which extends the lifetime of the components. Another advantage lies in the fact that the same MOS component can be used as a current measuring element in order to limit the latter, to detect the ends of travel and to protect motor 6 from current peaks.

The above system is controlled by the aforementioned central unit 18. This central unit 18 includes a microcontroller and/or a microprocessor which processes the control, measuring and calibrating functions of pressure sensor 20 by means of computer algorithms and programmes contained in a non volatile memory accessible to said microcontroller. Central unit 18 has analogue-digital converting means for this purpose. The control by central unit 18 of the stopping and working states as well as the rotational direction of driving motor 6 is performed using control circuit 24. This latter measures and also transmits to central unit 18 the variations in the supply current of motor 6 in order to detect the end-of-travel positions of window 4 and to protect the electronic circuit against current peaks resulting therefrom, as will be described in detail hereinafter.

Central unit 18 also controls the state of inputs-outputs 26 originating from or intended for other internal or external elements of the system. It is known that current microcontrollers can control a large number of input-outputs which enables the system to interact with several control or monitoring centres. This gives the system great flexibility of use and adjustment as a function of the desired applications. Among the input-output commands, one can cite:

the manual command for the main passenger and the other passengers. These commands can be of the progressive type. They can also be of the rapid action type where a simple pressure commands the whole opening or closing of window 4.

the centralised commands for closing all the panels. This commands can be manual, originate from the central computer or from the centralised door closing system;

an alarm (safety) function in the event of the introduction of an object between the window and the slide.

Figure 7:
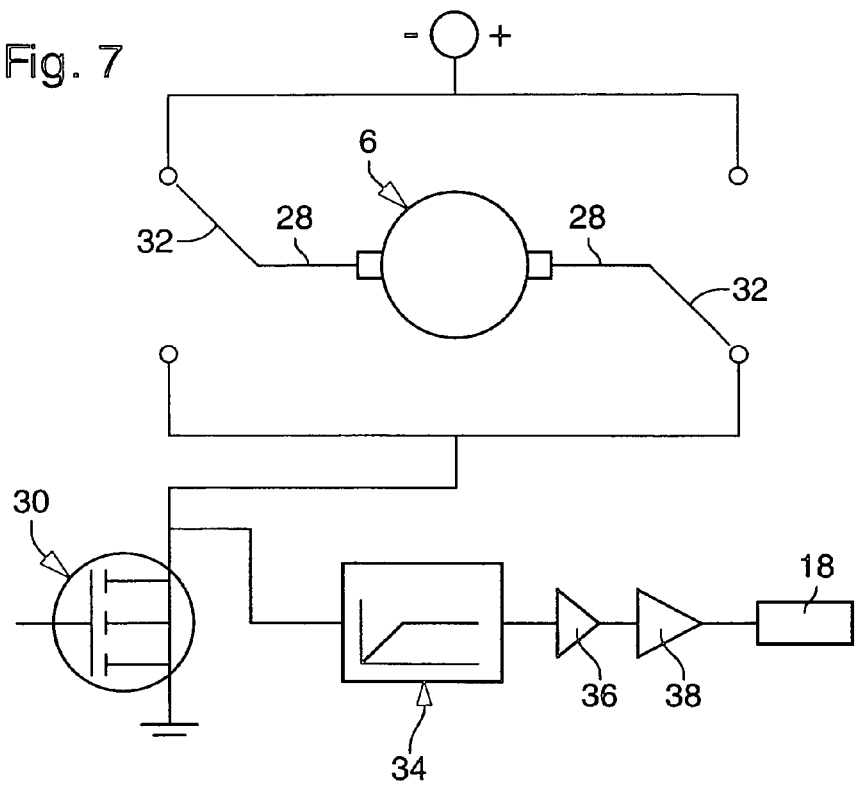
FIG. 7 is a schematic diagram of the means for switching the stop-start states and for controlling the direction of rotation of the motor as well as the means for indirectly detecting the presence of a foreign body braking the movement of the automobile vehicle window.

In accordance with a first aspect of the method according to the invention, the frequency of the pulses caused by the switching of brushes 28 of electric motor 6 driving window 4 is measured, and the driving of said window 4 is stopped when the pulse frequency is less than a predetermined frequency threshold. For this purpose, indirect type detection means are used, based on measuring the frequency of the pulses caused by the switching of brushes 28 of driving motor 6. As is seen in FIG. 7, these detection means include a MOS transistor 30 across the terminals of which the pulses caused by the switching of brushes 28 are received. According to a complementary feature of the invention, MOS transistor 30 further controls the switching of relays 32 of electric motor 6, and thus determines the direction of movement of sliding panel 4. The pulses received across the terminals of MOS transistor 30 then pass through a filter 34, an amplifier 36, then are reshaped by means of a comparator 38. Finally, the pulses are sent back to comparing means allowing the pulse frequency to be compared to a threshold frequency. These means are formed by central unit 18 which calculates the pulse frequency and compares it to the frequency threshold stored in the memory. Finally, when the pulse frequency becomes less than the threshold frequency, central unit 18 generates a second alarm signal which causes it to stop or reverse the working direction of driving motor 6. It thus becomes possible to detect the end-of-travel or the presence of a foreign body, such as, for example, an arm braking the movement of window 4 and preventing it from moving upwards. The comparison of the measured frequency with a reference frequency thus allows pre-detection of an obstacle and protects driving motor 6 and its control circuit 24 from particularly damaging current peaks.

According to a second aspect of the invention, central unit 18 counts the number of pulses caused by the switching of brushes 28 of driving motor 6 and deduces therefrom the position of window 4 from a rest position taken as reference. This reference position corresponds to the last calculated position of window 4 prior to the stopping of driving motor 6. Thus, when window 4 reaches an end-of-travel zone at a distance l from the top or bottom edge of frame 2 of door 1 into which window 4 slides, central unit 18 forms the means which allow a deceleration ramp for the speed of driving motor 6 to be programmed, and the power supply thereof to be cut off when the pulse frequency becomes substantially zero. Knowing that the variation in the supply current of motor 6 has a lag with respect to the rotational speed of said motor 6 with a time constant $\tau=L/R$ (where L is the inductance and R the resistance of driving motor 6), the control of a deceleration ramp and the stopping of motor 6 when the pulse frequency becomes substantially zero allows motor 6 and its control circuit 24 to be efficiently protected against current peaks.

The indirect method for determining the position of window 4 described above has however a drawback. When window 4 reaches its end-of-travel position and its driving motor 6 stops, it is not possible to determine whether this stopping is due to the fact that window 4 has abutted against frame 2 of door 1 into which it slides, or whether the stopping is due to the presence of a foreign body caught between the window 4 and the strut of said frame 2. This is why means for directly detecting the presence of a foreign body are used, these means including a pressure sensor 20 with an optical fibre 10 described hereinbefore. Thus, when window 4 is closed, one can deduce that in the absence of an alarm signal originating from pressure sensor 20, window 4 has abutted, at the end of its travel, against the strut of frame 2, and that any risk of an accident has been avoided. Conversely, if pressure sensor 20 generates an alarm signal, central unit 18 immediately commands the reversal of the working direction of driving motor 6.

Another object of the present invention is to provide a sequential detection system of the type described above operating in accordance with a sequential mode giving it intrinsic security.

For purposes of the invention, intrinsic security means the implementation of means and different operations which will allow central unit 18 to perform all the tests and adjustments enabling it to ensure that the direct and indirect detection means operate reliably and that the whole device according to the invention is given an increased level of safety. It is therefore necessary to provide periods of time in which central unit 18 will perform a certain number of test, adjustment and control operations in a sequential manner. Three distinct operation periods can be distinguished according to whether window 4 is idle, moving upwards or downwards.

During the period in which driving motor 6 of window 4 is idle, central unit 18 tests and calibrates the direct and indirect obstacle detection means. More precisely, the operations performed periodically or continuously during this first phase begin with a test of the overall proper working of the detection means. In the event of malfunction of one of the detection means, central unit 18 deactivates the faulty means. If a general failure of the detection means still exists, central unit 18 generates an alarm, for example a visual or acoustic alarm, for the attention of the user. The latter is thus informed that the electric window lifter system is operating in manual mode, and that he can no longer rely on the obstacle detection means according to the invention. He must thus pay more attention. If the overall proper working of the detection means is confirmed, central unit 18 then proceeds to correct the operating parameters of said detection means as a function of the modifications undergone by the safety device due to the effect of the evolution over time of the output of motor 6 and the transmission means, friction between window 4 and sealing gasket 8, climatic conditions or other factors.

During the phase in which window 4 rises and until it reaches the vicinity of the end-of-travel zone at a distance I from the top edge of frame 2 of door 1 into which said window 4 slides, the direct detection means generate an optical signal which travels across the top portion of said frame 2. This optical signal is picked up by receiver 14 then transmitted to central unit 18 which measures its intensity and compares it to a reference value defined during the idle phase of window 4. At the same time, the indirect detection means detect the pulses caused by the switching of brushes 28 of driving motor 6, then send these pulses to central unit 18 which calculates the frequency thereof and compares said calculated frequency to a threshold frequency defined during the idle phase of window 4. The measurement of the number of the aforementioned pulses also allows central unit 18 to calculate the position of window 4. Finally, central unit 18 commands the stopping then the reversal of the working direction of driving motor 6 in the event of non conformity of any one of the data transmitted by one of the two direct or indirect detection devices with the corresponding reference value.

During the phase in which window 4 rises to the end-of-travel position in which it abuts against the top portion of frame 2 of door 1 into which it slides, the direct detection means continue to play the same role as above. They generate an optical signal which travels across the top portion of frame 2 and which is transmitted via receiver 14 to central unit 18 which measures its intensity and compares it to a reference value defined during the idle phase of driving motor 6. In the event of non conformity of the data transmitted by the direct detection means with the corresponding reference value, central unit 18 commands the stopping and reversal of the working direction of driving motor 6. Conversely, the data provided by the indirect detection means are no longer used to detect the presence of an obstacle capable of preventing window 4 from closing completely. The indirect detection means detect the pulses caused by the switching of brushes 28 of driving motor 6, then send these pulses to central unit 18. Central unit 18 then calculates the frequency and the number of these pulses and deduces therefrom the speed and position parameters of window 4 whose values it compares to values defined during the idle phase of driving motor 6. Central unit 18 then commands a deceleration ramp for the rising speed of window 4 defined during the idle phase of driving motor 6 and cuts off the power supply thereto when the speed and position parameters each correspond to their reference value defined during the first phase.

Finally, the phase in which window 4 descends wherein the direct detection means are deactivated must be considered. As regards the indirect detection means, their function is to control the pulses and to measure the frequency of said pulses to calculate the speed and position parameters for window 4 and to compare them to values defined during the idle phase of driving motor 6. Central unit 18 causes the progression of window 4 to slow down in accordance with a deceleration ramp programmed during the first phase in which motor 6 is idle and cuts off the power supply to said motor 6 when the position and speed parameters respectively reach their reference values defined during said first phase.

Another object of the present invention is to provide a pressure sensor 20 which keeps its original performance capacities despite its sensitivity to physical disturbances such as the temperature and to the phenomena of wear of the materials of which it is formed. For this purpose, it is proposed, during the periods in which central unit 18 observes that driving motor 6 has stopped, that the operating parameters of pressure sensor 20, taken in any environmental conditions, are compared and corrected as a function of the same parameters of a standard sensor taken in known reference conditions stored in a non volatile memory accessible to the microcontroller of said central unit 18. Preferably, the operating parameters of pressure sensor 20 are measured and corrected repeatedly during the entire duration of the idle period of driving motor 6. When driving motor 6 restarts, only the last operating parameter corrections of pressure sensor 20 will be taken into account.

According to a first implementation variant, the method for calibrating pressure sensor 20 includes the steps of:
- cutting off for a short instant the electric power supply current to emitter 12 as soon as central unit 18 observes that driving motor 6 has stopped;
- measuring the offset level of the electric signal transmitted by receiver 14, then resetting its value to zero by means of an algorithm stored in the memory of the microcontroller of central unit 18;
- again supplying emitter 12 with power by means of a constant direct current $I_0$; and
- measuring output level $V_S$ of receiver 12; and allocating it a coefficient k so that $k\,V_S = V_R$, where $V_R$ is a known reference level of a standard sensor taken in known reference conditions.

When emitter 12 is not being supplied with power, the output signal of pressure sensor 20 is not zero. The detection circuit of sensor 20 is generally formed of a photodetector 14 followed by an amplifier circuit including an operational amplifier. All photodetectors have a so-called dark currents depending on its technology, its polarisation current and the temperature. This current which fluctuates over time is amplified and contributes in part to the generation of a parasite offset voltage at the output. Moreover, all operational amplifiers have a non zero voltage offset and current signal, with a more or less significant drift according to the quality of the component and the temperature conditions. Unless very stable and thus very expensive components are used, it is preferable to measure these offset values periodically and to substract them by means of a computer programme stored in the microcontroller memory of central unit 18, in order to keep only the useful signal originating from pressure sensor 20. Once the offset signal has been substracted, in the absence of any pressure, the level of the signal of pressure sensor 20 has to be reset periodically to a reference level, so as to operate with a fixed trigger threshold. One can thus be rid of dispersions in the operating features of the components (source 12 and detector 14), the optical signal injecting conditions in fibre 10, and fluctuations therein linked to said fibre.

According to a second implementation variant, the method for calibrating pressure sensor 20 includes the steps of:
- supplying emitter 12 with power by means of a periodic rectangular current;
- measuring the high output level $V_S$; and
- performing the operation $V_S(\Delta V_S/\Delta V_R) = V_S'$ and determining the coefficient $C = V_R - V_S'$ so that $V_S'' = V_R$, where $V_R$ and $\Delta V_R$ are known reference values for a standard sensor taken in known reference conditions, the ratio $\Delta V_S/\Delta V_R$ is the sensitivity correction coefficient for pressure sensor 20, and C is the residual offset correction coefficient for said sensor 20.

According to a preferred feature of the method of the invention, emitter 12 is supplied with power by means of a periodic rectangular current obtained by superposing on a constant current $I_O$ a small periodic variation $\Delta I_O$, so that the variation in the optical signal resulting therefrom can be considered linear.

For small applied pressures, the detected signal can be considered linear and be written in the form $VS = I_O\,GT$ where:

- G takes particular account of the global gain of pressure sensor 20, of the injection output and the output of detector 14;
- T represents the optical transfer function of pressure sensor 20; and
- $I_O$ represents the power of source 12 and thus, indirectly, its polarisation current.

By measuring the variation $\Delta V_S$ at the output of pressure sensor 20 following a small variation $\Delta I_O$ in the polarisation current, and by performing the ratio of these two variables, a measurement of the function of the optical transfer of pressure sensor 20, and thus its sensitivity is obtained. Further, performing the operation $V_S' = V_S\,(\Delta V_S/\Delta V_R)$ amounts to standardize the sensitivity of pressure sensor 20 taken in any environmental conditions with respect to the sensitivity of a standard sensor taken in reference conditions. The additional offset correction C such that $C + V_S' = V_R$ allows the residual differences linked to dispersion of the features of the components and to their variations as a function of the environmental conditions to be compensated.

According to a third implementation variant, the calibration method according to the invention includes the steps of:
- supplying emitter 12 with power by means of a periodic rectangular current;
- measuring the high output level $V_S$ of receiver 14, and its variation $\Delta V_S$;
- calculating the pressure applied as a function of the signal level measured by means of a polynomial equation having a degree of greater than or equal to 1 and whose coefficients are initially determined during a first calibration; and
- correcting these coefficients periodically as a function of the measurement results to obtain a reliable pressure measurement.

Preferably, emitter 12 is supplied with power by means of a periodic rectangular current obtained by superposing a small periodic variation $\Delta I_0$ on a direct current $\Delta I_0$.

This third calibration method requires a first calibration of pressure sensor 20 which allows the applied pressure to be calculated as a function of the voltage measured by means of a polynomial approximation of degree 3 or 4. This method allows simple corrections of the polynomial coefficients to be performed, or more elaborate corrections by means of specific algorithms.

Figure 8:
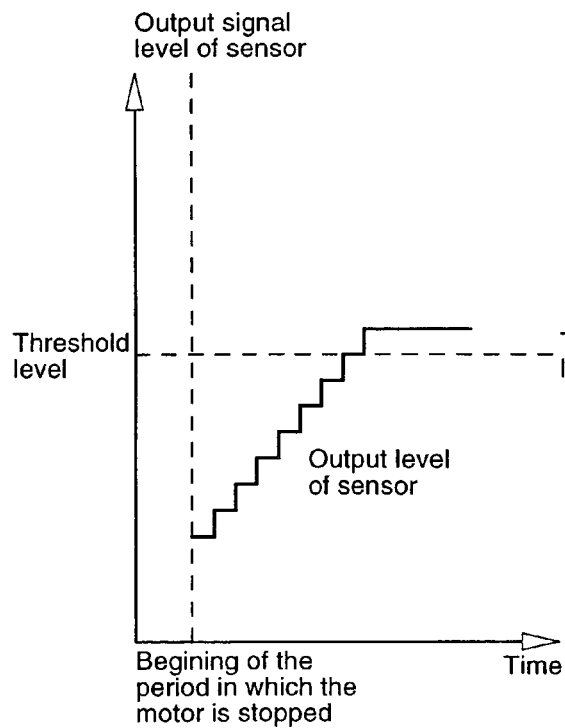
Figure 9:
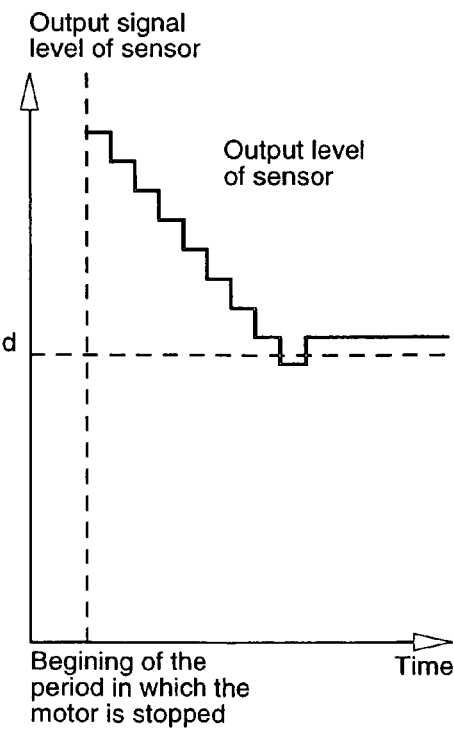

According to yet another variant, the autocalibrating method can use the variable polarisation current and constant trigger threshold correction illustrated in FIGS. 8 and 9. These two Figures show that during the idle periods of driving motor 6, the polarisation current of emitter 12 is increased or decreased, for example, in increments, until the output signal level of pressure sensor 20 is substantially equal to the alarm trigger threshold level (taking into account the resolution of the system). When this condition is achieved, the polarisation current level of emitter 12 is blocked so that the output signal of pressure sensor 20 is at a known value, higher than the alarm trigger threshold level. It is to be noted that the threshold voltage of comparator 38 can be fixed here either by a circuit external to the microcontroller of central unit 18, or by the microcontroller itself (by programming).

According to yet another variant, the calibration method can use the variable trigger threshold and fixed polarisation current correction which is illustrated by FIGS. 10 and 11. In this case, the polarisation current of emitter 12 is constant, and the value of the threshold signal of comparator 36, which fixes the alarm threshold, is increased or decreased, for example in increments, until this value becomes substantially equal to the value of the output signal of pressure sensor 20 (taking into account the resolution of the system). Then the threshold is blocked at a known value less than the output signal. One can see, in this second case, how the microcontroller of central unit 18 controls an external circuit in order to adjust the alarm trigger threshold level. The advantage, in this case, is that it is not necessary to measure the output signal of pressure sensor 20 (and thus to provide the microcontroller with an analogue-digital converter), which allows low cost microcontroller components to be selected. But it is to be noted that the threshold can also be fixed by programming. In such case, it is necessary to use an analogue-digital converter to be able to communicate with the microcontroller. It should also be noted that all the autocalibrating methods which have been described in this patent can be combined with each other.

On the basis of the methods described hereinbefore, it is thus possible to correct the operating parameters of pressure sensor 20 in two distinct ways, namely by correcting the polarisation current of emitter 12, or by correcting the alarm trigger threshold.

Thus, as shown in FIG. 12, the microcontroller of central unit 18, which does not have an analogue-digital converter, generates a rectangular fixed frequency signal PWM, with variable pulse widths. This is known as pulse width modulation or PWM. Each width value can be coded over four or eight bits or more by the microprocessor. The PWM signal is sent to an integrator 40 of the low-pass filter type, which converts the pulses into distinct voltage levels. Thus, by varying the encoding of the PWM signal, one can programme the shape and level of the polarisation current of emitter 12. It is also possible, if required, to modify the value of the threshold signal of comparator 38 which fixes the alarm threshold by means of an integrator 42. There also exists other ways to modify the above-mentioned signals by means of other modulation methods. By way of example, pulses frequency modulation (PFM) or pulse code modulation can be cited.

The autocalibrating method can be extended to the indirect detection means of the system. Indeed, it has not been established that the indirect detection method is always reliable over time. It has to be expected that the output of driving motor 6 and the transmission elements will evolve over time. The same is true of the friction of window 4 on sealing gasket 8 which can evolve due to the effect of deformations in frame 2 of door 1. Likewise, one has to expect the movement of the window to change according to the speed of movement of the vehicle. Not taking into account these disturbance parameters could lead to a malfunction in the system. Monitoring and evaluating the level speed of window 4 in the zone where the movement thereof is substantially uniform, for example by the moving average speed method, could allow the calculation of the position of window 4, and the threshold frequency value for pre-detecting obstacles to be corrected.

Outside the window movement acceleration and deceleration phases, central unit 18 can also store in a table, for different positions of said window 4, the corresponding frequency of the pulses caused by the switching of brushes 28 of driving motor 6. The frequency measurement of these pulses informs central unit 18 as to the speed of movement of window 4 when it passes into a given position. This operation is renewed every time that window 4 rises again. Central unit 18 thus knows that a certain rising speed corresponds to a determined position of window 4. Central unit 18 will then compare, for each position of window 4, the measured pulse frequency to the frequency stored in the memory. It is possible that, due to the effect of ageing of the materials, particular climatic conditions (humidity, high temperatures or conversely particularly low temperatures) or other phenomena which can affect the output of the system, central unit 18 observes a certain difference between the measured frequency and the stored frequency. If this difference does not exceed a predetermined safety threshold, central unit 18 understands that a modification has occurred in the working of the system and will consequently correct the threshold frequency value for pre-detecting obstacles.

Figure 13A:
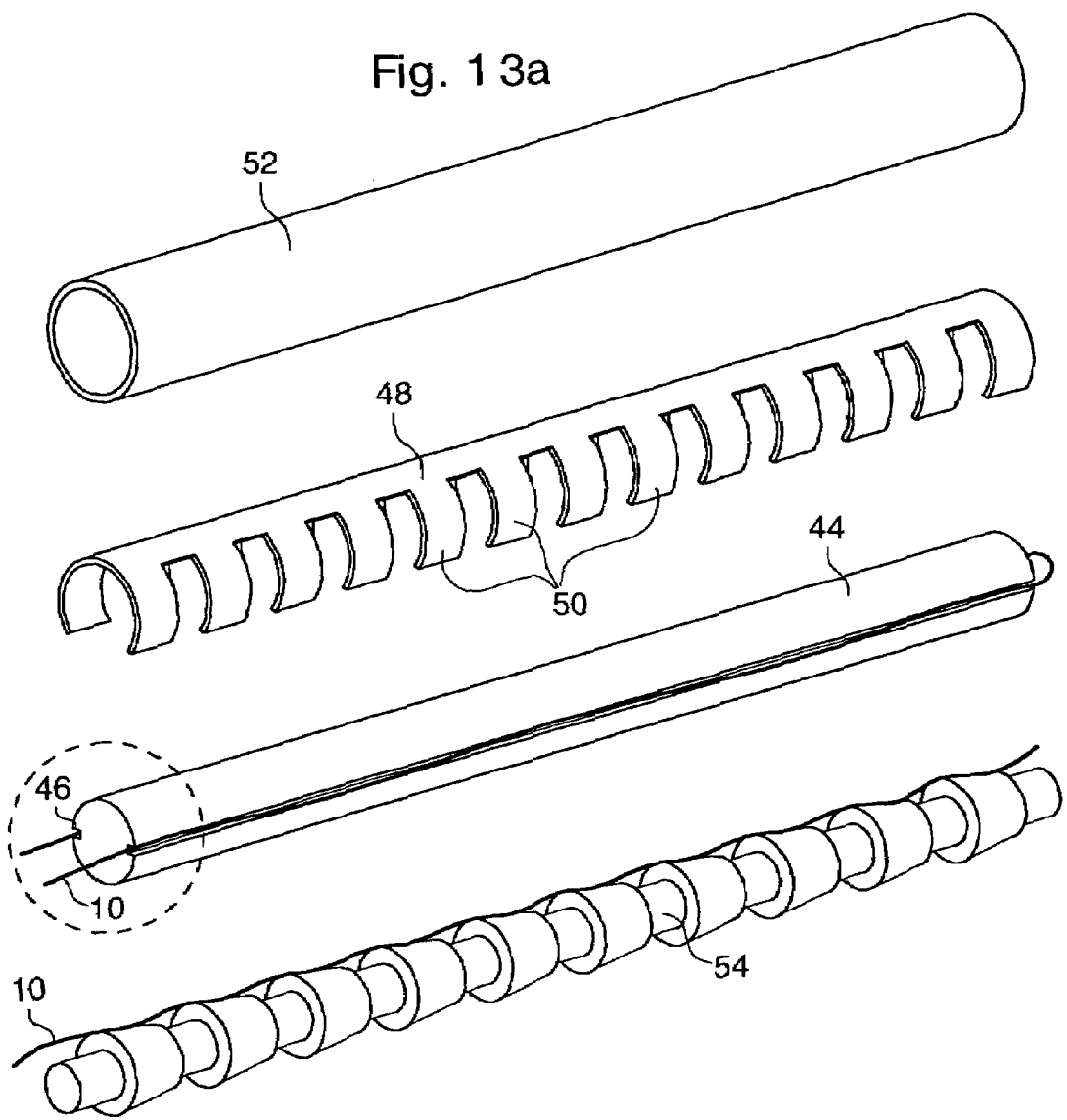
Figure 13B:
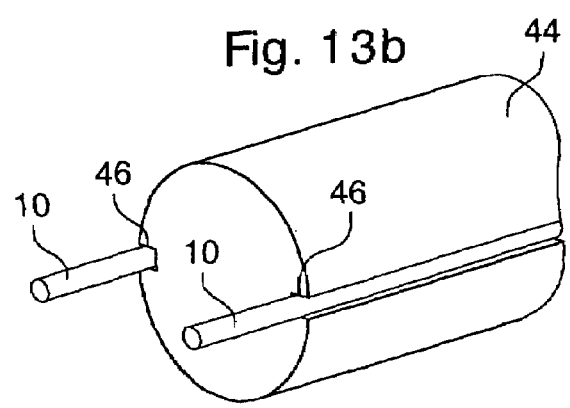

Another object of the present invention is to provide an optical fibre pressure sensor which is simple and inexpensive to manufacture. For this purpose, as is seen in FIG. 13a, the pressure sensor according to the invention includes a central core made of foam or flexible rubber which takes the form of a support 44 of substantially cylindrical shape or elongated with a polygonal cross-section. In the surface of support 44 two diametrically opposite grooves 46 are made, which extend parallel to the longitudinal axis of support 44 and in which optical fibre 10 is housed without stress (see FIG. 13b which is a detailed view of a region of FIG. 13a surrounded by a dot and dash line). Cylindrical support 44 and its optical fibre 10 are inserted in a covering 48 which is slit longitudinally and made, for example, of a thin hard plastic material in which a plurality of clamping jaws 50 have been cut. These jaws 50 are used to curve optical fibre 10 by elastic pressure and to modify locally its radius of curvature. The pressure sensor thereby formed is finally covered in a sheath 52 made of foam or a very flexible material.

According to a variant which is also shown in FIG. 13a, the central core of the pressure sensor according to the invention can be made in the form of a support 54 formed of a periodic succession of truncated elements along which optical fibre 10 is fixed. This embodiment has the advantage of improving the sensitivity of the sensor by creating initial microbends.

According to another alternative embodiment shown in FIG. 14, optical fibre 10 is mounted directly on the inner face of jaws 50 of covering 48. For this purpose, the free end of said jaws 50 is slightly bent in order to hold and guide optical fibre 10 along covering 48. This embodiment has the advantage of keeping optical fibre 10 rectilinear. It has been observed that the more the optical fibre used in such sensors is bent, the shorter the lifetime of said sensors.

Figure 15:
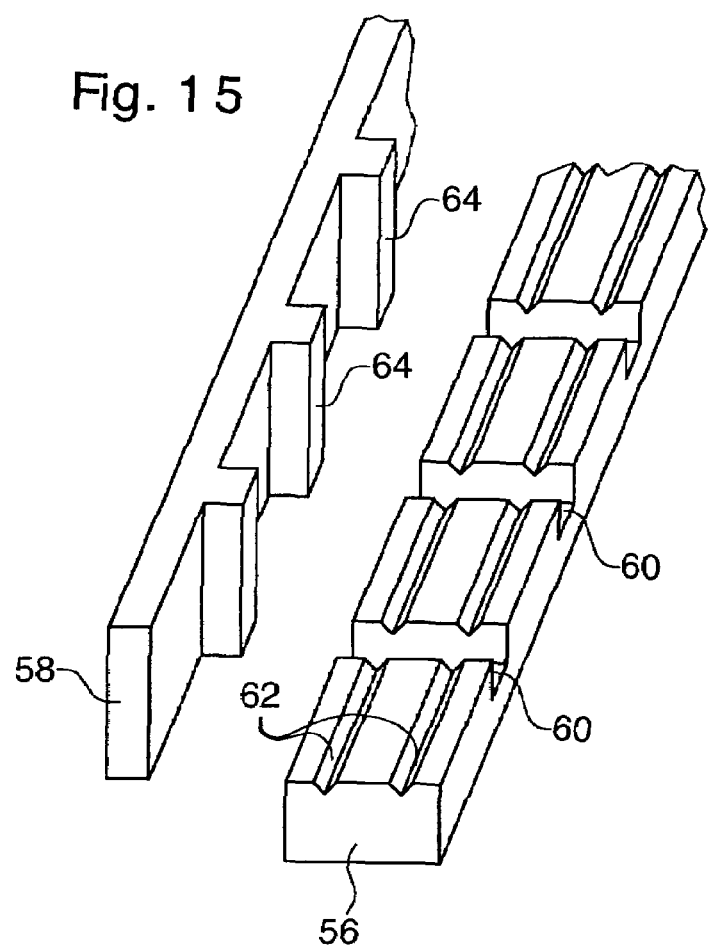
Figure 16:
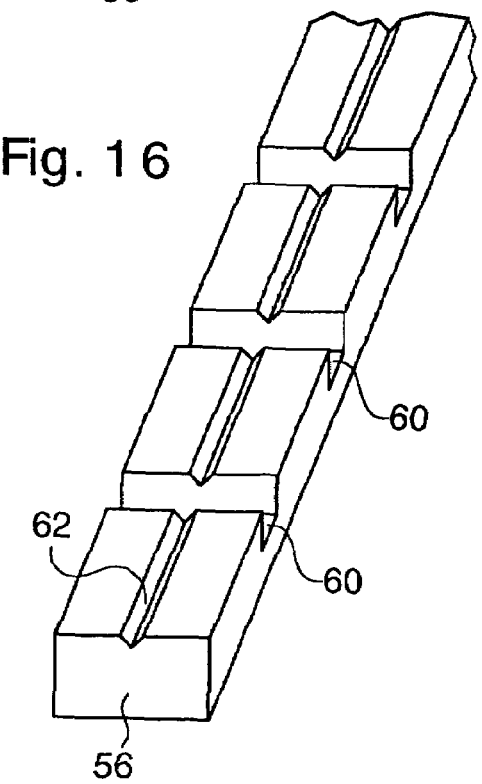

According to yet another alternative embodiment shown in FIG. 15, optical fibre 10 is sandwiched between first and second bands respectively 56 and 58 made from two elastomeric materials of the same type but of different hardness. First band 56, made by means of a relatively hard material, has a succession of transverse cavities 60 regularly distributed along said band 56. In the case of operation in transmission mode, the top face of band 56 has two grooves 62 in which optical fibre 10 is housed. These grooves 62 are arranged parallel to and on either side of the longitudinal axis of symmetry of band 56 and have a V shaped or semi-circular profile. Cavities 60 of first band 56 are partially or totally filled with studs 64 having a complementary shape to that of said cavities 60 and arranged on the underside of band 58. The elastomeric material used to make second band 58 is of the same type as that used for first band 56 but has a substantially lower hardness. Thus, first and second bands 56 and 58 are complementary both as regards their geometrical shape and the alternation in hardness of their materials. Finally, optical fibre 10 is housed between the two bands 56 and 58 and can keep a rectilinear profile or be slightly and periodically curved. In the case of operation in reflection mode, only one groove 62 is necessary (FIG. 16). According to a variant, second band 58 can be flat, made by means of a certain thickness of a substantially soft elastomeric material.

The spacing of jaws 50 or cavities 60 defines the microbending period. In order to obtain optimum sensitivity of the pressure sensor, the microbending period will be selected so as to obtain a strong coupling between the modes guided in the core of optical fibre 10 and the modes radiated by the sheath.

This optimum period depends on the optogeometrical features of the multimode optical fibre 10 used. If optical fibre 10 is of the step index type, the microbending period T has to satisfy the relationship:

$$T \leq \frac{2\pi\rho^2 k n_c}{1 + 2\rho k n_c \sqrt{\Delta}}$$

where $k=2\pi/\lambda$ is the module of the wave vector, $\rho$ and $n_C$ are respectively the radius and the core refractive index of fibre 10 and $\Delta$ is the relative difference between the core and sheath indices of optical fibre 10.

For a graded index fibre, the optimum microbending period has to be a multiple value of period T given by the relationship:

$$T \leq \rho\pi\sqrt{\frac{2}{\Delta}}$$

where $\rho$ and $\Delta$ are respectively the core radius of fibre 10 and the relative difference between the core and sheath indices of optical fibre 10.

Since pressure sensitivity is more significant in the case of graded index fibres, it is this type of fibre which will preferably be selected.

According to another feature of the invention, optical fibre 10 can be of the plastic type, entirely formed of polymer materials.

An embodiment of the indirect obstacle detection means was described with particular reference to FIG. 7 above wherein the frequency of the pulses caused by the switching of brushes 28 of driving motor 6 (electric encoding) is detected. It goes without saying that other embodiments of the indirect detection means can be envisaged. For this purpose, FIGS. 17 to 23 annexed to the present Patent Application show an optical encoding system.

Figure 17:
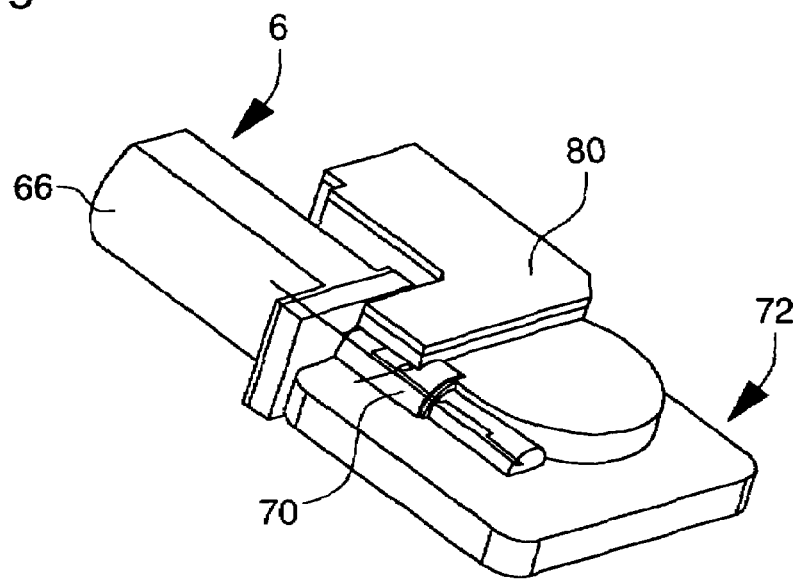
FIG. 17 is a general perspective view of the electric driving motor associated with an optical encoding device.
Figure 18:
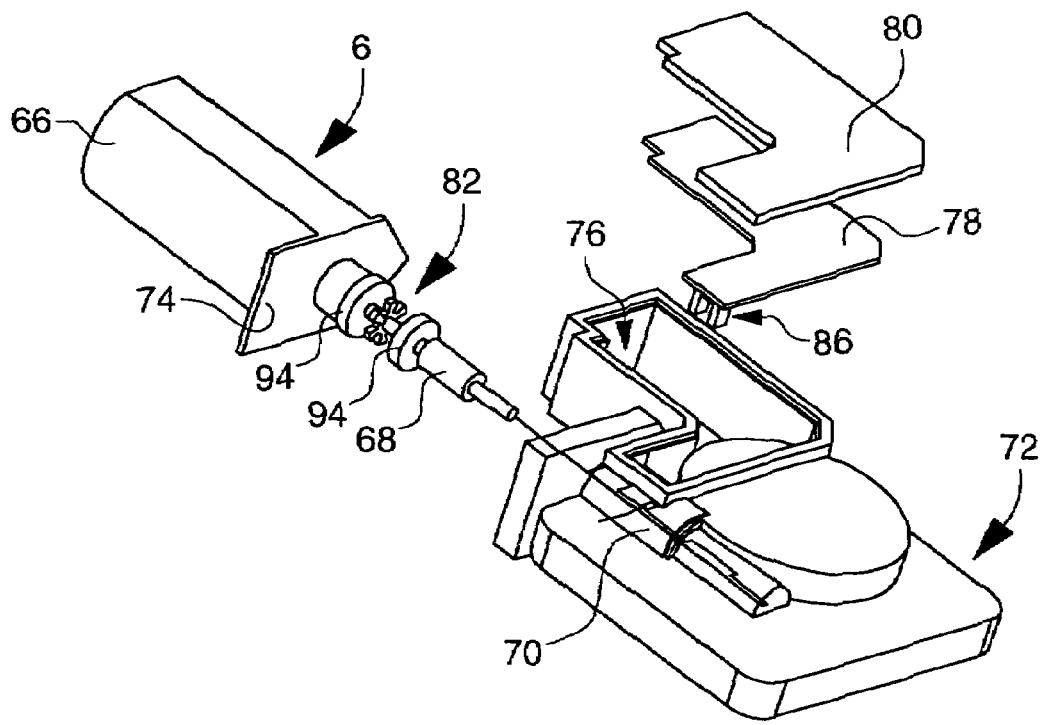
FIG. 18 is a perspective view of the electric driving motor and the optical encoding device shown in FIG. 17 in the disassociated state.

As is clear from FIGS. 17 and 18, electric driving motor 6 is housed in a housing 66 from which its shaft 68 protrudes. This shaft 68 penetrates an opening 70 of generally cylindrical shape made in a case 72 against which housing 66 of driving motor 6 is fixed by means of a substantially flat base of generally rectangular shape. Case 72 has a cavity 76 whose perimeter matches the shape of a printed circuit 78 which is housed in said cavity 76. Cavity 76 is finally closed using a cover 80.

According to the present invention, an encoding disc 82 of small thickness is fixedly mounted to shaft 68 of driving motor 6 (see FIGS. 19 and 20). This disc 82 has a certain number of slits 84 regularly spaced on the periphery of said disc 82. An opto-coupling device 86 is placed facing disc 82. This opto-coupling device 86 includes an optical emitter 88 and an optical receiver 90 aligned along a common axis in relation to each other and separated by a sufficient distance to allow encoding disc 82 to pass. Optical emitter 88 sends a light beam to optical receiver 90. When shaft 68 of driving motor 6 rotates, it drives encoding disc 82 in rotation. Each time that one of slits 84 of encoding disc 82 crosses the line connecting emitter 86 to receiver 88, light will propagate from said emitter 88 to said receiver 90. Receiver 90, via the effect of the incident light, will emit an electric pulse which will be sent to central unit 18. It will easily be understood that the number and the frequency of these pulses are respectively proportional to the position and the speed of movement of window 4.

Opto-coupling device 86 described above operates in the light beam transmission mode. One can also envisage making this opto-coupling device 86 operate in reflection mode. In such case, a plurality of reflective elements are deposited on one of the faces of encoding disc 82 at regular intervals from each other. Emitter 82 and receiver 90 are then placed side by side facing the reflective elements.

Figure 21:
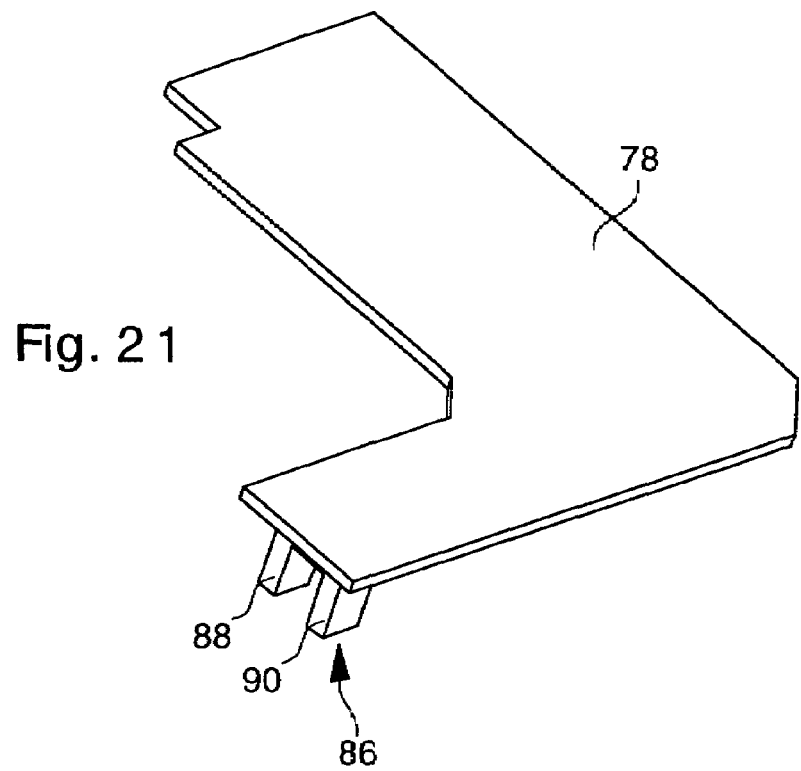
FIG. 21 is a perspective view of a printed circuit on the bottom face of which is fixed the opto-coupling device.
Figure 22:
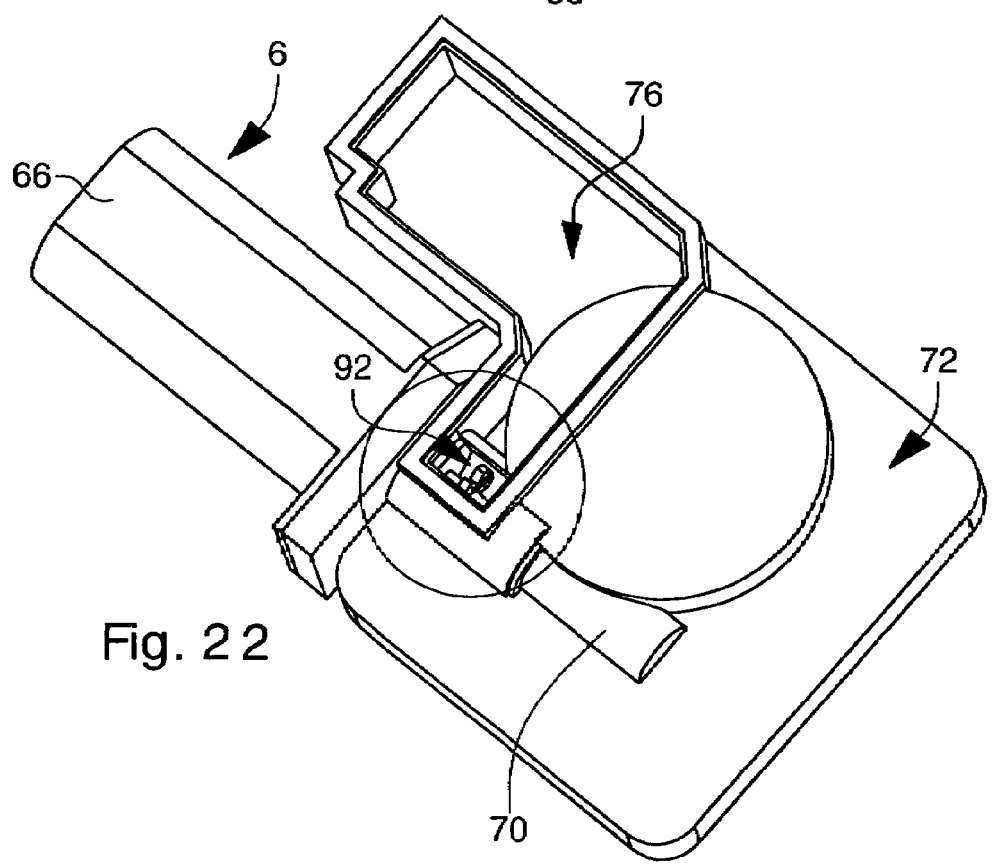
FIG. 22 is a perspective view showing the opening made in the case accommodating the motor shaft for the passage of the opto-coupling device.
Figure 23:
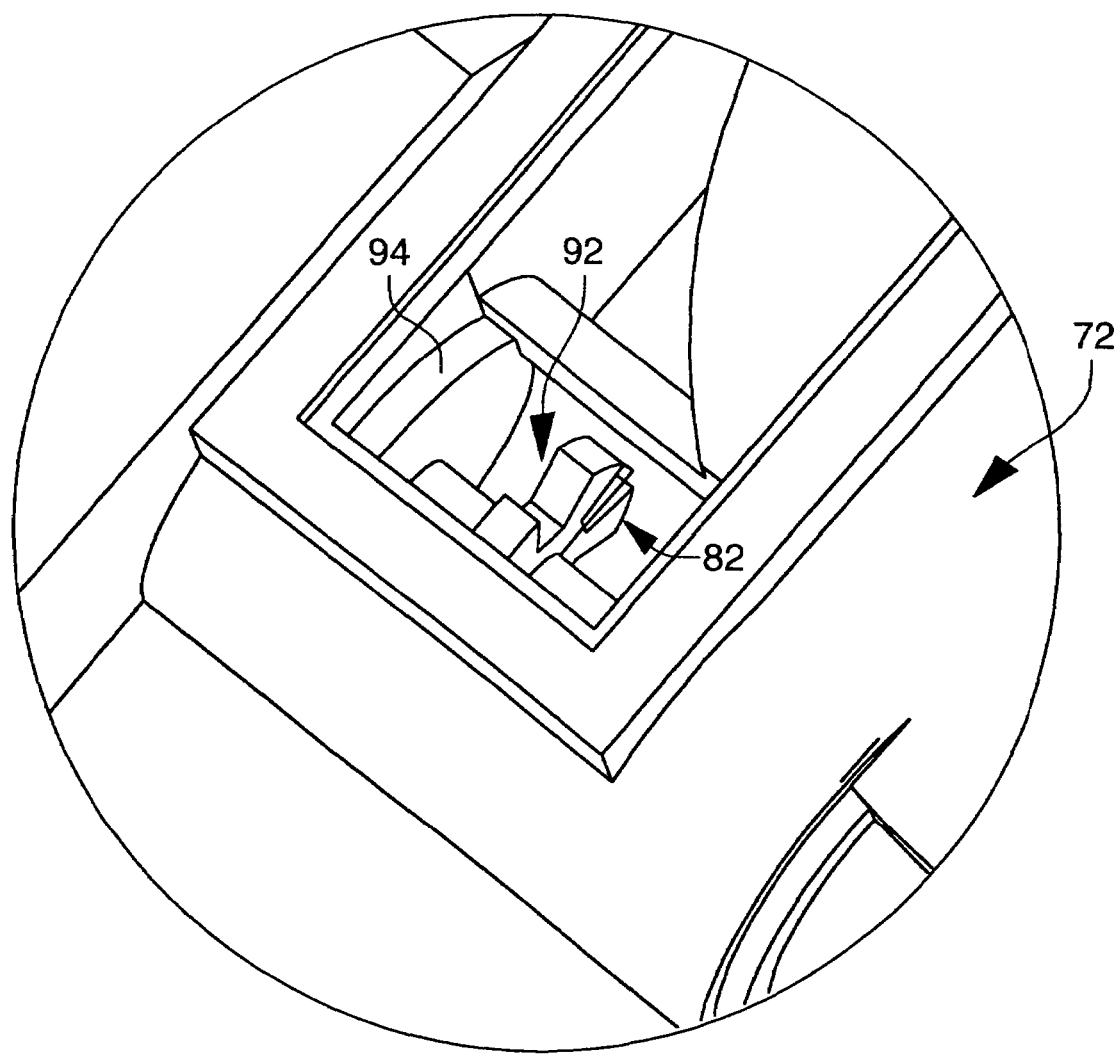
FIG. 23 is a detailed view of the opening made in the case shown in FIG. 22.

FIGS. 21 to 23 show that opto-coupling device 86 is fixed onto the bottom face of printed circuit 78. When printed circuit 78 is inserted in cavity 76 of case 72, opto-coupling device 86 penetrates an opening 92 made in the top face of said case 72 and caps encoding disc 82. Finally two rotating sealing gaskets 94 are provided, placed upstream and downstream of encoding disc 82 which allow sealing and protection of optical components 88, 90 to be assured as regards dust and other deposits.

According to yet another embodiment, the indirect detection means are formed by a magnetic encoding device. For this purpose, magnetised elements of small dimensions are moulded inside a cylinder made of polymer material which is fixed to shaft 68 of driving motor 6. A magnetic field detector such as a Hall probe is placed in proximity to this cylinder. The rotation of motor 6 thus allows electric pulses to be generated whose number and frequency are respectively proportional to the position and speed of window 4.

It goes without saying that various variants and modifications fall within the scope of the present invention.

The invention claimed is:

1. Sequential control method for a moving panel (4) which is driven so as to slide in a frame (2) by an electric motor (6), including a first sequence consisting in:

detecting by first means the presence of a foreign body capable of preventing the complete closing of the moving panel (4) by becoming caught between said panel (4) and the frame (2) into which said panel (4) slides, these first means being capable of generating a first alarm when the presence of said foreign body is detected; and measuring by second means the frequency of the pulses caused by the rotation of the electric motor (6) driving the moving panel (4), and deducing from this measure an indication of the travel of the moving panel (4) from a known reference position beforehand, these second means being also capable to detect the presence of the foreign body when the frequency of the pulses becomes less than a predetermined threshold frequency and to produce a second alarm when this presence is detected;

wherein, during the phase in which moving panel (4) rises and until it reaches the vicinity of an end-of-travel zone in which the panel (4) has only a distance (I) to cover before its complete closing, stopping, then reversing the working direction of the driving motor (6) is commanded upon reception of the first and/or second alarm signal, and wherein, during the ascent of the moving panel (4) over the remaining distance (I) until its complete closing, only the first means are used to detect the presence of the foreign body, whereas the second means are only used to determine the position of said panel (4) with respect to the frame (2) into which it slides.

2. Method according to claim 1, wherein a deceleration ramp for the speed of the driving motor (6) is commanded when the moving panel (4) reaches the end-of-travel zone.

3. Method according to claim 1, wherein, in the absence of the first alarm signal, the driving motor (6) is stopped when the moving panel (4) is in the end-of-travel zone and that the pulses frequency becomes substantially zero.

4. Method according to claim 1, wherein the reference position is the last calculated position of the moving panel (4) before the driving motor (6) stops.

5. Method according to claim 1, wherein it further includes a second sequence consisting, during the periods in which it is observed that the motor (6) driving the moving panel (4) has stopped, in calibrating the first detection means by comparing and correcting the operating parameters of said first detection means, taken in any environmental conditions, as a function of corresponding parameters of standard detection means taken in known reference conditions.

6. Method according to claim 5, wherein it further includes a third sequence consisting, during the phase of descent of the moving panel (4), to deactivate the first detection means, whereas the second means are used to calculate the speed and position parameters for said moving panel (4) and to compare them to reference values defined during the idle phase of driving motor (6), the progression of said moving panel (4) being slowed down then stopped in accordance with a deceleration ramp when its position and speed reach said reference values.

7. Method according to claim 1, wherein the first detection means of the presence of a foreign body capable of preventing the moving panel (4) from closing completely comprise an optical fibre pressure sensor (20).

8. Method according to claim 1, wherein the frequency measured with the help of the second means is the frequency of the pulses caused by the switching of the brushes (28) of the electric motor (6).

9. Method according to claim 1, wherein the frequency is the frequency of the pulses generated by an optical encoding device.

10. Method according to claim 8, wherein the frequency is the frequency of the pulses generated by a magnetic encoding device.

11. Method according to claim 1, wherein the second means include a MOS transistor (30) across the terminals of which are received pulses caused by switching of brushes (28) of the electric motor (6), these pulses then passing through a filter (34) and an amplifier (36) before being reshaped by means of a comparator (38).

12. Method according to claim 11, wherein the MOS transistor (30) further controls the switching of the relays (32) of the electric motor (6) and thus determines the direction of movement of the moving panel (4).

13. Method according to claim 9, wherein the optical encoding device includes an optical disc (82) as well as an optical emitter (88) and an optical receiver (90).

14. Method according to claim 13, wherein the optical disc (82) is mounted on shaft (68) of the motor (6) and has a plurality of slits (84) regularly spaced on the periphery of said disc (82), and in that the optical emitter (88) and the optical receiver (90) are aligned along a common axis with respect to each other and are separated by a sufficient distance to allow the disc (82) to pass.

15. Method according to claim 13, wherein the optical disc (82) is mounted on a shaft (68) of the driving motor (6) and has on one of its faces a plurality of reflective elements arranged at intervals at regular distances from each other, and in that the optical emitter (88) and the optical receiver (90) are placed side by side facing the reflective elements.

16. Method according to claim 10, wherein the magnetic encoding device includes a plurality of magnetised elements arranged on shaft (68) of the driving motor (6), a magnetic field detector being placed in proximity to said magnetised elements.

17. Method according to claim 16, wherein the magnetic field detector is a Hall probe.

18. Method according to claim 1, wherein comparison means allow the frequency of the pulses caused by the rotation of the driving motor (6) of the moving panel (4) to be compared to a threshold frequency.

19. Method according to claim 18, wherein means allow a deceleration ramp for the speed of the driving motor (6) of moving panel (4) to be programmed when the latter reaches an end-of-travel zone.

20. Method according to claim 19, wherein the comparison and deceleration ramp programming means include a central unit (18) with a microcontroller and/or a microprocessor.

21. Method according to claim 7, wherein the pressure sensor (20) is formed of an optical fibre (10) associated with means (12, 14) for emitting and receiving optical signals propagating within said optical fibre (10), the emitting means (12), supplied with electric power, injecting a light signal into the optical fibre (10), the light signal propagating as far as the receiving means (14) which transmit, in response to the light signal transmitted by the optical fibre (10), an electric signal to a central unit (18) with a microcontroller and/or a microprocessor which analyses the data originating from said receiving means (14) and, in the event of an incident, allows the electric motor (6) driving the moving panel (6) to be stopped or the working direction thereof to be reversed.

22. Method according to claim 21, wherein the pressure sensor (20) operates in transmission mode.

23. Method according to claim 21, wherein the pressure sensor (20) operates in reflection mode.

24. Safety device according to claim 22, wherein the emission means (12) include an electroluminescent diode and in that the reception means (14) include a photodiode.

25. Method according to claim 24, wherein the electroluminescent diode and the photodiode are of the SMD type.

26. Method according to claim 25, wherein the electroluminescent diode and the photodiode are arranged in the same case which also accommodates both ends of the optical fibre (10) forming the pressure sensor (20), this case being also provided with connection means facilitating the securing thereof onto an electronic board.

27. Method according to claim 23, wherein the emission (12) and reception (14) functions are assured by a laser diode provided with its own photodetective cell.

28. Method according to claim 21, wherein the optical fibre (10) is arranged along at least one edge of an opening (2) intended to be closed by the moving panel (4).

29. Method according to claim 21, wherein it includes the steps of:
cutting off for a short instant the emitter's (12) electric supply current as soon as it is observed that the motor (6) driving the moving panel (4) has stopped;
measuring the offset level of the electric signal transmitted by the receiver (14), then resetting its value to zero;

supplying the emitter (12) again by means of a constant direct current $\Delta I_0$; and measuring the output level $V_S$ of the receiver (14), and allocating it a coefficient k such that $kV_S=V_R$, where $V_R$ is a known reference level of a standard sensor taken in known reference conditions.

30. Method according to claim 21, wherein it includes the steps of:

supplying the emitter (12) by means of a periodic rectangular current;

measuring the high output level $V_S$ of the receiver (14) as well as its variation $\Delta V_S$, and performing the operation $V_S (\Delta V_S/\Delta V_R)=V'_S$ and determining the coefficient $C=V_R-V'_S$ so that $V_S''=V_R$, where $V_R$ and $\Delta V_R$ are known reference values of a standard sensor taken in known reference conditions, the ratio $\Delta V_S/\Delta V_R$ is the pressure sensor (20) sensitivity correction coefficient, and C is the residual offset correction coefficient of said sensor (20).

31. Method according to claim 30, wherein it includes the steps of:

supplying the emitter (12) by means of a periodic rectangular current;

measuring the high output level $V_S$ of the receiver (14) as well as its variation $\Delta V_S$;

calculating the pressure applied as a function of the level of the measured signal by means of a polynomial equation of a degree greater than or equal to 1 and whose coefficients are initially determined during a first calibration; and periodically correcting these coefficients as a function of the measurement results in order to obtain a reliable pressure measurement.

32. Method according to claim 30, wherein, during the operating periods of the driving motor (6), the emitter (12) is supplied by means of a direct current, and in that, during the idle periods of the driving motor (6), the emitter (12) is supplied by means of a periodic rectangular current obtained by superposing a low periodic variation $\Delta I_O$, on a constant current $I_O$, so that the variation in the resulting optical signal can be considered linear.

33. Method according to claim 29, wherein the measurement and the correction of the operating parameters of the pressure sensor (20) are performed repeatedly, during the entire duration of the idle period of the motor (6) driving the moving panel (4).

34. Method according to claim 29, wherein, during the operating periods of the motor (6) driving the moving panel (4), only the last corrections to the operating parameters of the pressure sensor (20) stored in the memory are taken into account.

35. Method according to claim 21, wherein, during the idle periods of the driving motor (6), the polarisation current of the emitter (12) is increased or decreased until the output signal level of the pressure sensor (20) is substantially equal to the alarm trigger threshold level, and wherein, when this condition is achieved, the polarisation current level of the emitter (12) is fixed so that said output signal of said pressure sensor (20) is at a known value, greater than the alarm trigger threshold level.

36. Method according to claim 21, wherein, during the idle periods of the driving motor (6), the threshold signal value of a comparator (38) which fixes the alarm threshold is increased or decreased, until said value becomes substantially equal to the output threshold value of the pressure sensor (20), and wherein, when this condition is achieved, the alarm threshold is fixed at a known value lower than said output signal of said pressure sensor (20).

37. Method according to claim 35, wherein the microcontroller of the central unit (18) generates a fixed frequency rectangular signal, with variable pulse durations, said signal being then sent to an integrator (40, 42) which converts the pulse durations into distinct voltage levels, so that the shape and the level of the emitter (12) polarisation current can be programmed, or the threshold signal value comparator (38) which fixes the alarm threshold can be modified.

38. Method according to claim 35, wherein the microcontroller of the central unit (18) generates a signal whose pulses are frequency modulated, said signal being then sent to an integrator (40, 42) which converts the signal into distinct voltage levels, so that the shape and the level of the emitter (12) polarisation current can be programmed, or the threshold signal value comparator (38) which fixes the alarm threshold can be modified.

39. Method according to claim 35, wherein the microcontroller of the central unit (18) generates a signal using the coded pulse modulation, said signal being then sent to an integrator (40, 42) which converts said signal into distinct voltage levels, so that the shape and the level of the emitter (12) polarisation current can be programmed, or the threshold signal value comparator (38) which fixes the alarm threshold can be modified.

40. Method according to claim 5, wherein, during the second sequence, it comprises the steps consisting in calibrating the second means by:

measuring, for different positions of the moving panel (4) relative to the frame (2) into which said panel moves, the corresponding frequency of the pulses caused by the rotation of the motor (6) to determine the instantaneous speed of movement of the panel (4) in a given position; and comparing, for each position of the moving panel (4), the frequency of the measured pulses to the frequency of the same pulses during the preceding travel of said moving panel (4) so that, if there is a difference between said frequencies and this difference does not exceed a predetermined safety value, the threshold frequency is corrected so that it does not command the stopping and reversal of the working direction of the motor (6).

* * * * *